S. S. & D. A. HUFFMAN.
TIRE PROTECTOR.
APPLICATION FILED DEC. 18, 1911.
1,070,475.
Patented Aug. 19, 1913.
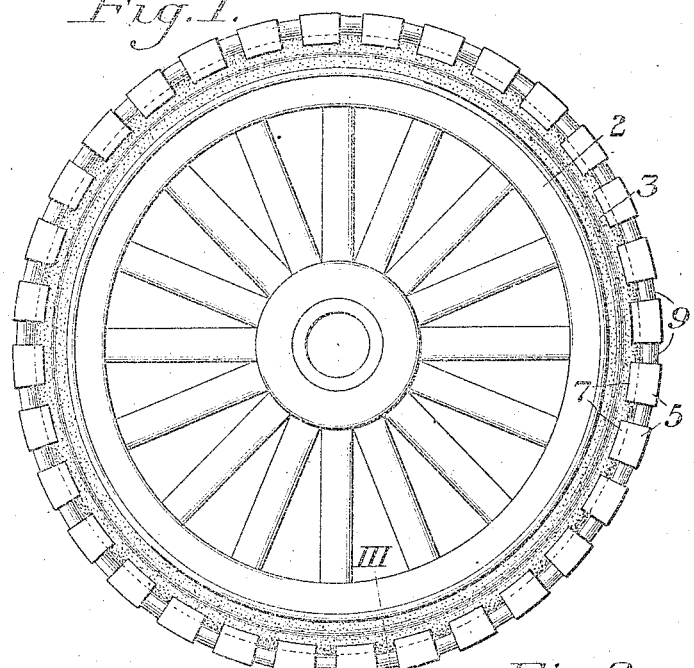
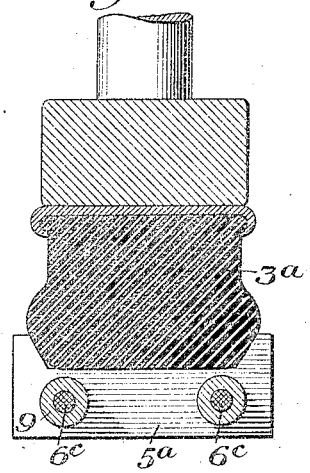
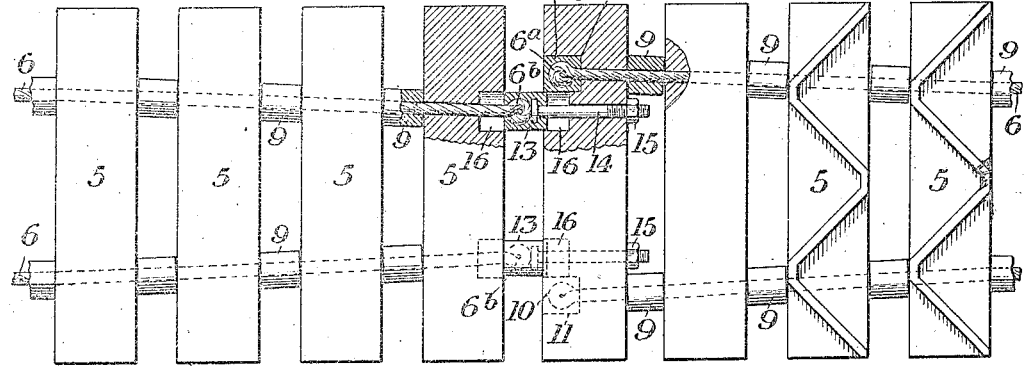
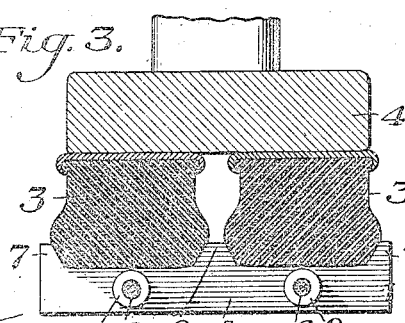
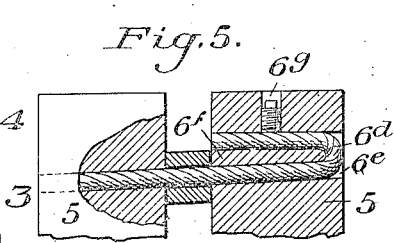
WITNESSES
R. A. Balderson
J. B. Bluming
INVENTORS
S. S. Huffman
D. A. Huffman
by Bakewell, Byrnes, Parmelee,
Attys

UNITED STATES PATENT OFFICE.

SILAS S. HUFFMAN AND DUR A. HUFFMAN, OF YOUNGSTOWN, OHIO.

TIRE-PROTECTOR.

1,070,475.  Specification of Letters Patent.  Patented Aug. 19, 1913.

Application filed December 18, 1911. Serial No. 666,587.

*To all whom it may concern:*

Be it known that we, SILAS S. HUFFMAN and DUR A. HUFFMAN, residents of Youngstown, in the county of Mahoning and State of Ohio, have invented a new and useful Improvement in Tire-Protectors, of which the following is a full, clear, and exact description, reference being had to the accompanying drawings, forming part of this specification, in which—

Figure 1 is a side view of a vehicle wheel having a protector applied thereto embodying our invention; Fig. 2 is a plan view of a portion of the protector, partly broken away; Fig. 3 is a section on the line III—III of Fig. 1; Fig. 4 is a view similar to Fig. 3, but showing a modification, Fig. 5 is a detail view showing another modification.

Our invention has relation to protectors for vehicle tires; and more particularly to protectors for the tires of heavy vehicles, such as automoble trucks. It is well known to users of these trucks that the tires rapidly cut and wear in the severe service to which they are subjected in use; and this difficulty is becoming so great in the practical use of these trucks that there is an imperative demand for an efficient protector which can be readily applied; which will be inexpensive; which will effectually protect the tire; and which will be of a nature to give proper traction. Such a protector our invention is designed to provide.

The nature of our invention will be best understood by reference to the accompanying drawings in which we have shown two preferred forms thereof, and which will now be described, it being premised, however, that various changes can be made in the details of construction and arrangement of the parts without departing from the spirit and scope of our invention as defined in the appended claims.

In these drawings, the numeral 2 designates a vehicle wheel which, in the form shown in Figs. 1, 2 and 3, carries two elastic tires 3 seated side by side upon the rim 4 in the usual manner.

Our improved protector comprises a series of spaced segmental tread blocks 5 which are strung on two parallel flexible cables or wires 6, the whole forming an armor adapted to detachably surround the tires 3. Each of the tread segments is preferably of the form shown, being arranged to extend transversely of the tread surfaces of the tires 3 with the side lips or flanges 7 embracing the outer edge portions of the respective tires, and also preferably having a separating lip or rib 8 extending inwardly between the two tires. These segments may be composed of any suitable material, either metal, or wood faced with metal, and may be provided with a roughened or ribbed surface in order to give greater traction and prevent sliding or skidding, as shown on two of the segments in Fig. 2. The segments are held in the proper spaced relation on the flexible wires or cables 6 by means of the spacing tubes or sleeves 9. One end of each cable is rigidly secured to one of the segments, preferably by forming an enlargement 6ª of the cable end and embedding it in a body 10 of Babbitt metal or other material which can be cast or otherwise firmly secured around such enlarged end. These anchoring bodies 10 are seated in recesses 11 formed in the segment. The other ends of the cables are preferably formed with similar enlargements 6ᵇ embedded in similar anchoring bodies. A bolt 14 is also embedded in each of the anchoring bodies 13, these bolts extending through openings formed in the segment to which the first named ends of the cables are secured, and are provided with adjusting nuts 15. To permit the necessary movement of the protector in service, the tread segments between which the anchoring bodies 13 are placed, are preferably one or both recessed, as shown at 16 in Fig. 2, in order to permit some "go-and-come" movement.

Fig. 4 shows the invention adapted to single tire wheels. In this case the blocks 5ª are made correspondingly shorter than the blocks 5 first described, being adapted to embrace the tread portion of the single tire 3ª, and being strung upon the flexible cables 6ᶜ.

In Fig. 5 we have shown a slightly different way in which one end of a cable may be fastened. In this figure, the end portion 6ᵈ of the cable is threaded through a divided opening 6ᵉ in one of the segments 5, being bent around the dividing wall 6ᶠ of said opening and held by a set-screw 6ᵍ. This manner of fastening permits slack to be readily taken up.

Our invention provides a very simple and highly efficient form of protector for tires of the character described. It can be readily applied to and removed from the tires and forms a highly efficient tread or traction surface for the wheels.

What we claim is:

1. In a protector for solid tires, a plurailty of flexible connections having strung thereon a series of transversely extending blocks with recesses on their inner faces to fit a solid tire, spacing pieces also strung on the flexible connections between blocks, said blocks having their peripheral tread surfaces extending beyond the spacing pieces, the flexible connections being of greater circumference than the solid tire, and means for adjustably securing the ends of the connections after wrapping the protector around the tire; substantially as described.

2. In a protector for solid tires, a plurailty of flexible connections beyond the tread surface of the tire, a series of transversely extending blocks with recesses on their inner faces to fit the solid tire, tubular spacing pieces also strung on the flexible connections between said blocks, said blocks having their peripheral tread surfaces extending beyond the spacing pieces, and means for adjustably securing the ends of the connections to each other to maintain the protector in position on the tire; substantially as described.

3. In a protector for solid tires, a plurality of flexible connections having strung thereon a series of transversely extending blocks, each block having a plurality of recesses on its inner face arranged to receive the outer portions of a plurality of solid tires, spacing pieces also strung on the flexible connections between the blocks, said blocks having their peripheral tread surfaces extending beyond the spacing pieces, the flexible connections being of greater circumference than the solid tire and located about centrally beyond the recesses on the inner faces of the blocks, and means for adjustably securing the ends of the connections after wrapping the protector around the solid tire; substantially as described.

4. A protector for tires, comprising a plurality of transversely arranged blocks, flexible cables arranged side by side and upon which the blocks are strung, and means for spacing the blocks, the ends of the cables having anchoring bodies secured thereto, seats for the anchoring bodies at one end of each cable formed in one of the blocks, and means for adjustably connecting the anchoring bodies at the other ends of the cables to said block, said block and the one adjacent thereto having recesses to permit movement of the anchoring bodies; substantially as described.

In testimony whereof, we have hereunto set our hands.

SILAS S. HUFFMAN.
DUR A. HUFFMAN.

Witnesses:
 ANTHONY B. CALVIN,
 RAY BUTLER.